United States Patent
Akahoshi et al.

(10) Patent No.: US 7,583,572 B2
(45) Date of Patent: Sep. 1, 2009

(54) APPARATUS AND METHOD FOR CALIBRATING LASER POWER IN AN OPTICAL DISK APPARATUS

(75) Inventors: Kenji Akahoshi, Yokohama (JP); Atsushi Saito, Hino (JP); Makoto Nihei, Tokyo (JP); Junichi Ishii, Narashino (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 515 days.

(21) Appl. No.: 10/808,922

(22) Filed: Mar. 24, 2004

(65) Prior Publication Data
US 2005/0083802 A1    Apr. 21, 2005

(30) Foreign Application Priority Data
Oct. 16, 2003  (JP)  .............................. 2003-355801

(51) Int. Cl.
*G11B 7/00*  (2006.01)
(52) U.S. Cl. .................................. 369/47.51; 369/53.26
(58) Field of Classification Search ........................ None
See application file for complete search history.

(56) References Cited

U.S. PATENT DOCUMENTS

| | | | | |
|---|---|---|---|---|
| 4,734,914 A | * | 3/1988 | Yoshikawa | .................. 372/33 |
| 5,136,569 A | * | 8/1992 | Fennema et al. | ......... 369/53.23 |
| 5,157,642 A | * | 10/1992 | Tsukamura et al. | ...... 369/30.15 |
| 5,425,013 A | * | 6/1995 | Fennema et al. | ......... 369/44.35 |
| 5,481,510 A | * | 1/1996 | Masaki et al. | ............ 369/30.13 |
| 2002/0110065 A1 | * | 8/2002 | Wang et al. | ............... 369/47.53 |
| 2002/0150394 A1 | * | 10/2002 | Osakabe | ..................... 386/126 |

FOREIGN PATENT DOCUMENTS

| | | |
|---|---|---|
| JP | 02-31341 A | 2/1990 |
| JP | 03-091123 A | 4/1991 |
| JP | 03-142726 A | 6/1991 |
| JP | 04-14622 A | 1/1992 |
| JP | 05-143997 | 6/1993 |
| JP | 08-329510 | 12/1996 |

OTHER PUBLICATIONS

ECMA, Standard ECMA-338, 80 mm (1,46 Gbytes per side) and 120 mm (4,70 Gbytes per side) DVD Re-recordable Disk (DVD-RW), Dec. 2002, pp. 117-119.
Japan Patent Office (JPO) office action for patent application JP2003-355801 (Apr. 1, 2008).

* cited by examiner

*Primary Examiner*—Andrea L Wellington
*Assistant Examiner*—Nathan Danielsen
(74) *Attorney, Agent, or Firm*—Townsend and Townsend and Crew LLP

(57) ABSTRACT

Laser light irradiation can be performed on a recordable surface in a defocused state with a high-power laser beam with safety without incurring data destruction due to erroneous data recording or overwrite recording even in the recording on an eccentric disk or regardless of occurrence of wobbling of the disk surface. Laser irradiation is performed after moving an objective lens radially inwardly beyond a PCA located at an inner peripheral portion of the disk (or radially outwardly beyond the PCA located at an outer peripheral portion of the disk) by using a tracking coil.

9 Claims, 6 Drawing Sheets

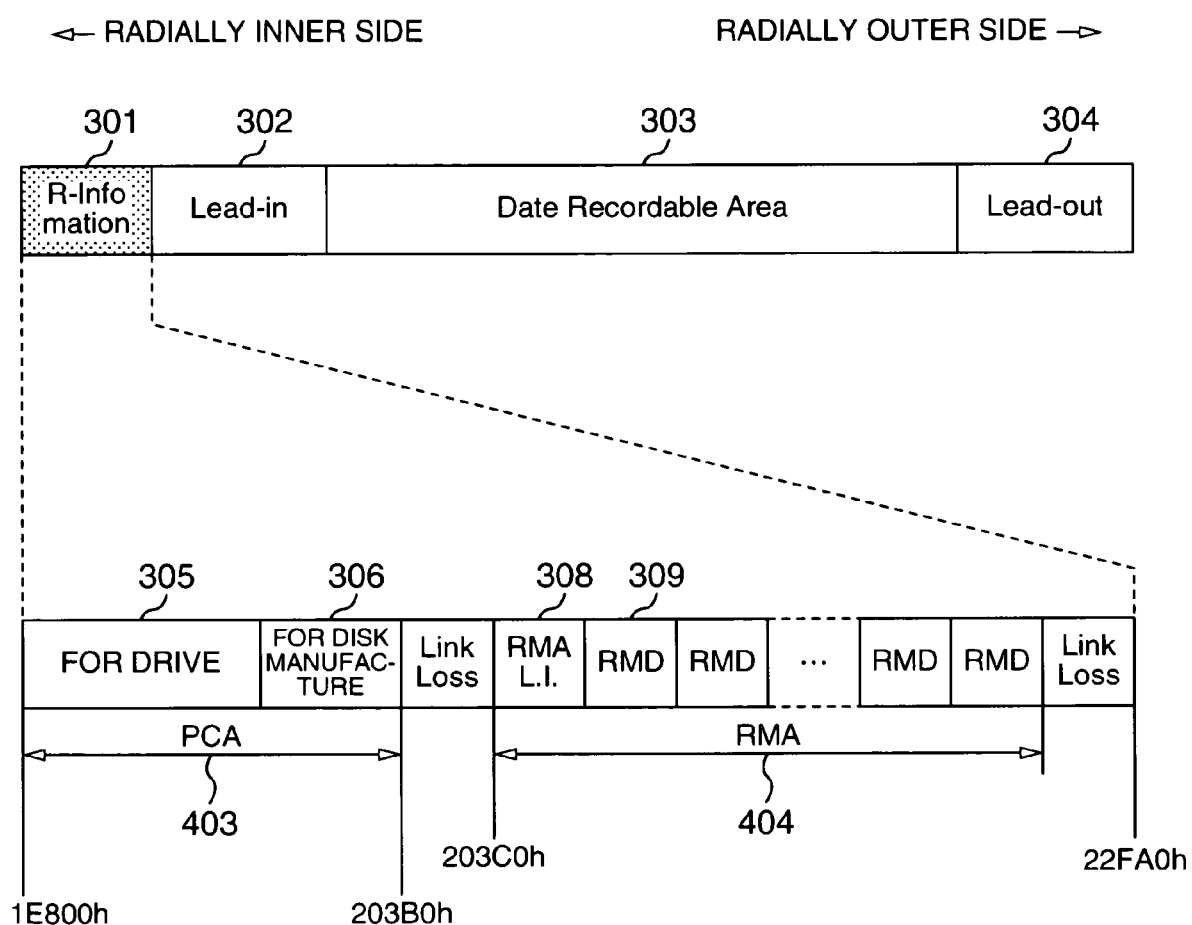

APPARATUS AND METHOD FOR CALIBRATING LASER POWER IN AN OPTICAL DISK APPARATUS

BACKGROUND OF THE INVENTION

1. Field of the Invention

The present invention relates to an optical disk apparatus for recording signals or data on a recordable optical disk by irradiating it with a laser beam. Further, the invention concerns a laser power calibration method for such optical disk apparatus.

2. Description of the Related Art

A variety of optical disk apparatuses are known for recording data on an optical disk-like recording medium such as a CD-R/RW (CD-Recordable/Rewritable), a DVD-R/RW (DVD-Recordable/Re-recordable), a DVD-RAM (DVD-Rewritable) or the like (hereinafter generally referred to as the optical disk) through irradiation with a laser beam.

In the optical disk apparatuses such as mentioned above, a laser beam emitted from a semiconductor laser element such as a laser diode is focused onto a recordable surface of the optical disk to form record marks of different reflectances by changing the physical property of the recordable surface for thereby realizing the data recording.

The optical disks are commercially available from a plurality of manufacturers. Consequently, the recording sensitivity of the recordable surface differs on a per manufacturer basis and hence the recording characteristic may disperse or vary correspondingly from one to another disk. Besides, since the recording characteristic varies in dependence on the ambient temperature, the recording characteristic may differ remarkably as the recording environment changes. For these reasons, even in the case where the whole recordable surface is irradiated with the laser beam of a constant power or intensity, irradiation does not always result in optimal consistency or uniformity.

Such being the circumstances, it is generally practiced to perform an adjustment or control for setting the irradiation power of the laser beam at optimum before starting recording in an effort to enhance the recording quality. This procedure is known as the optimum power calibration or OPC in short. By way of example, in the case of the DVD-R, a power calibration area is defined in a radially inner zone of the disk (see Standard ECMA-338 "80 mm (1.46 Gbytes per side) and 120 mm (4.70 Gbytes per side) DVD Re-recordable Disk (DVD-RW)", Annex H titled "Optimum Power Control"). More specifically, in the optical disk apparatus, test recording and reproduction of a predetermined data pattern are performed in the power calibration area in precedence to the actual recording of data in a user data recording area for the purpose of determining the optimal laser power irradiation intensity on the basis of the result of the test recording/reproduction.

Further, as one of the laser power adjusting or regulating methods, there has been proposed a method of optimizing the laser power by forming the focal point of an objective lens at a location distanced from the recordable surface (hereinafter this state will be referred to as the defocused state), whereon the laser irradiation is performed for evaluating the quantity of irradiation light. For more particularly, reference may have to be made to e.g. JP-A-8-329510. With this adjusting method, recording of data on the recordable surface can be avoided because the laser beam is not focused in alignment with the recordable surface.

SUMMARY OF THE INVENTION

However, the laser power adjusting method described in JP-A-8-329510 suffers problems which will be mentioned below. Firstly, when this method is adopted, there arises the possibility of the data being destroyed in a management data area located adjacent to the power calibration area due to eccentricity of the optical disk, wobbling rotation thereof, etc., regardless of the irradiation with the laser beam in the defocused state (hereinafter referred to as the "defocused irradiation"). In particular, the risk of the data being destroyed becomes high when the irradiation is performed with a high power. This will be elucidated below by reference to FIGS. 2, 3 and 4 of the accompanying drawings.

FIG. 2 is a block diagram showing schematically a structure and major components of an optical pickup unit which is designed for recording a signal on an optical disk and/or reading out a signal recorded on the optical disk.

In the optical disk apparatus which is equipped with this optical pickup unit, a laser beam 206 emitted from a laser diode 207 is projected to be focused onto a recordable surface 214 of a recordable optical disk 215, whereby the signal recording/reproducing operation is carried out.

In FIG. 2, reference numeral 201 denotes a laser diode driver module for controlling the emission power of the laser diode 207 by controlling the driving current therefor while switching the laser driving current in conformance with a record signal (i.e., signal to be recorded) for thereby generating a recording pulse signal of a predetermined waveform. Further, numeral 216 designates a spindle motor for rotating the optical disk 215.

The laser beam 206 emitted from the laser diode 207 is divided into two luminous fluxes by means of a beam splitter 208, wherein one of the luminous fluxes is inputted to a front monitor 212 while the other is focused onto the recordable surface 214 through the medium of a deflecting prism 209 and an objective lens 210. A power monitor circuit 203 is provided for detecting the laser power from the output of the front monitor 212. The power for the recording/reproducing operation is reflected in the output of the front monitor 212.

Further, a tracking correcting mechanism for correcting the position of the objective lens 210 in the tracking direction (radial direction) and a focus correcting mechanism for correcting the position of the objective lens 210 in the focusing direction (i.e., direction perpendicular to the disk surface) are implemented by a moving coil assembly 211 which is composed of a focusing coil for aligning the focal point of the laser beam with the recordable surface and a tracking coil designed for fine adjustment of the objective lens in the radial direction for reading out the signal along the pit train.

The luminous flux condensed by the objective lens 210 forms a focal point on the recordable surface 214 for effecting the recording/reproduction. The light rays reflected from the recordable surface are inputted to a detector 213 by way of the objective lens 210, the deflecting prism 209, the beam splitter 208 and a preamplifier 204 to undergo a signal processing in a signal processing unit 205 after having been amplified by the preamplifier 204.

The signal processing unit 205 is designed for demodulating the reproduced signal picked up from the optical disk to digital data by binarizing the reproduced signal to thereby acquire predetermined data. The demodulated data is then fetched by a controller 202.

The pickup unit composed of the moving coil assembly 211, the deflecting prism 209, the beam splitter 208, the laser diode 207, the front monitor 212, the detector 213 and other is capable of performing search operation, being moved from the radially inner side of the disk toward the radially outer side thereof or vice versa on and along a guide screw shaft (not shown).

Next, referring to FIG. 3, description will turn to the disk format structure of a DVD-R. The DVD-R disk is composed of an R-information area 301, a lead-in zone 302, a data recordable area 303 and a lead-out zone 304 arrayed in this order as viewed from the radially inner side of the DVD-R toward the radially outer side thereof. The R-information area 301 can roughly be divided into a power calibration area (hereinafter also referred to as PCA) 403 and a recording management area (hereinafter also referred to as RMA) 404. The PCA 403 is provided for the purpose of adjusting the laser power and subdivided into a PCA 305 allocated for the optical disk apparatus (drive) and a PCA 306 allocated for a disk manufacturer. On the other hand, the RMA 404 is composed of an RMA lead-in zone 308 and recording management data (RMD) areas 309. Recorded in the RMD areas 309 are the ID (identifier) intrinsic to the disk and various data required for post recording/reproduction, i.e., disk management data indispensably required for the intrinsic recording/reproducing operation.

Next, referring to FIGS. 4A, 4B and 4C, description will be made of the locuses along which the light beam is projected when an eccentric disk is used or upon occurrence of wobbling of the disk surface. Incidentally, reference numerals 406, 407 and 408 in these figures denote locuses, respectively, along which the recordable surface is radiated with a laser beam 405 projected in the defocused state.

FIG. 4A is a view for illustrating an ideal state in a hitherto known or conventional laser power adjusting or calibrating method. An optical disk 401 is rotating around a center axis, i.e., a disk rotation axis 402. Reference numeral 409 denotes a center hole formed in the disk at a center thereof. Further, reference numerals 403 and 404 denote the PCA (power calibration area) and the RMA (recording management area) described hereinbefore in conjunction with FIG. 3. In the case of the status illustrated in FIG. 4A, the locus 406 lies within the PCA 403 and exerts no influence to the RMA 404.

Next, referring to FIG. 4B, description will be made on the assumption that an eccentric disk is employed. In this conjunction, with the phrase "eccentric disk", it is intended to mean a disk in which the position of the center hole 409 is departed from the geometrical center of the disk. Since the track can not be followed in the defocused state, the locus 407 will fall within the RMA 404 upon rotation of the eccentric disk. As a consequence, data stored in the RMA 404 may possibly be destroyed.

In addition, referring to FIG. 4C, let's consider the case where wobbling of the disk occurs under the influence of warping or curvature and high-speed rotation of the disk. In this case, the disk rotates, being accompanied with undulation of the disk surface, as indicated by an arrow 410. Accordingly, even in the case where the disk is rotated in the defocused state, there may take place the state close to the just focused state at some portion of the locus 408, as a result of which data recorded in the PCA 403 may unwantedly be destroyed when a so-called test irradiation is performed with the laser beam of high power.

When the two events mentioned above occur simultaneously, i.e., when the wobbling takes place with the eccentric disk being used, the possibility of the data recorded in the RMA 404 being destroyed may further increase, giving rise to a serious problem.

In the light of the state of the art described above, it is an object of the present invention to solve or mitigate the problem of data destruction which may occur upon adjustment or calibration of the laser power through the OPC (optimum power control).

In view of the above and other objects which will become apparent as the description proceeds, it is proposed according to an aspect of the present invention that upon effectuating the OPC, the objective lens is moved toward the radially inner side of the disk beyond the PCA in precedence to the laser light emission, whereon the light quantity of the laser irradiation is observed. Further, when the OPC is effectuated for the disk having the PCA on the radially outer side, the objective lens is moved toward the radially outer side of the disk beyond the PCA in precedence to the laser light emission for observing the light quantity of the laser irradiation.

According to the teachings of the present invention mentioned above, the OPC can be effectuated or carried out with enhanced safety while protecting the recorded data from being destroyed even in the case where the eccentric disk is used and/or the wobbling of the disk takes places in the course of rotation thereof.

Other objects, features and advantages of the invention will become apparent from the following description of the embodiments of the invention taken in conjunction with the accompanying drawings.

BRIEF DESCRIPTION OF THE DRAWINGS

In the course of the description which follows, reference is made to the drawings, in which:

FIG. 3 is a view showing a structure of a DVD-R disk;

DETAILED DESCRIPTION OF THE EMBODIMENTS

Figure 1:
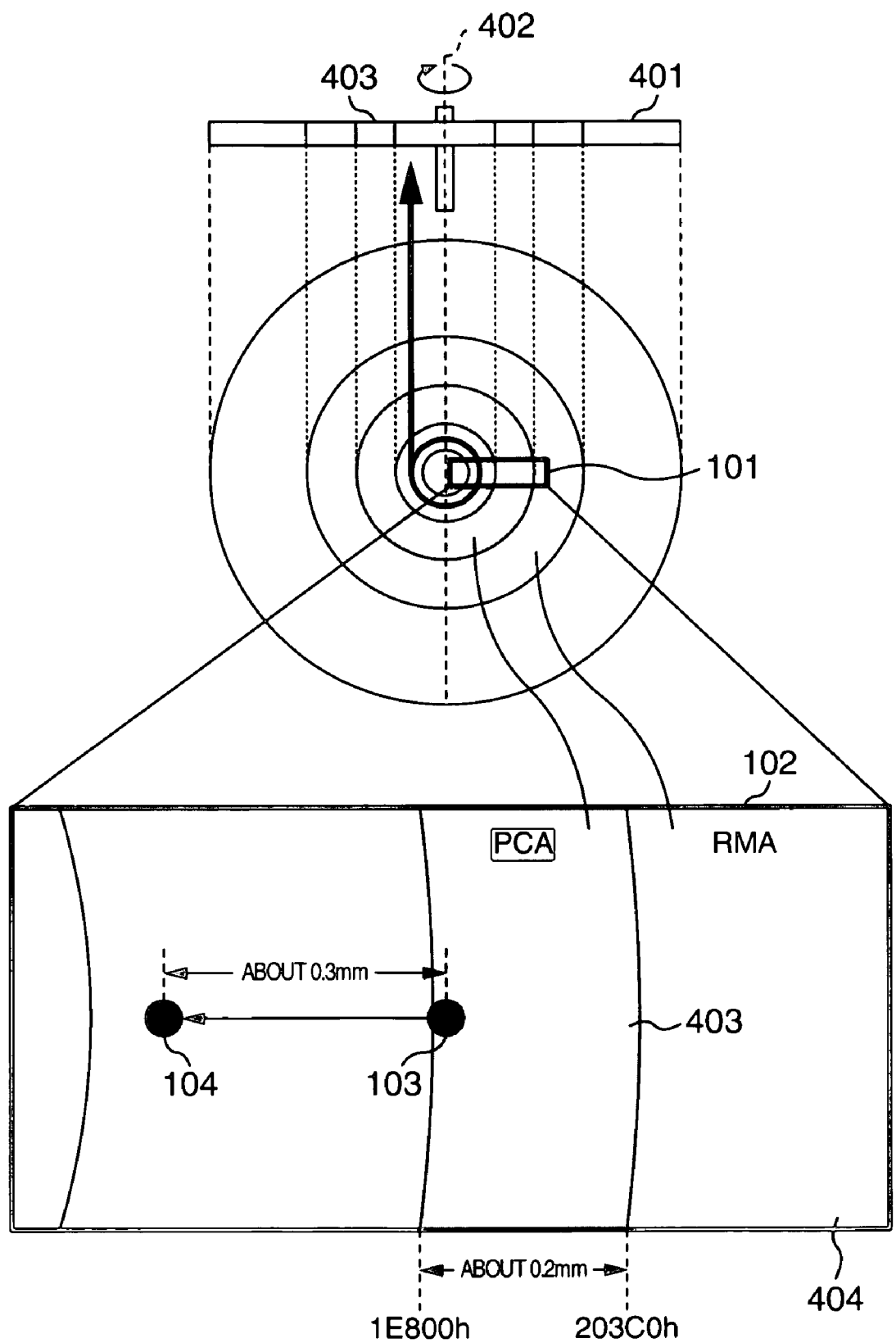
FIG. 1 is a view for illustrating in detail an optimum power calibration or OPC according to a first embodiment of the present invention.
Figure 2:
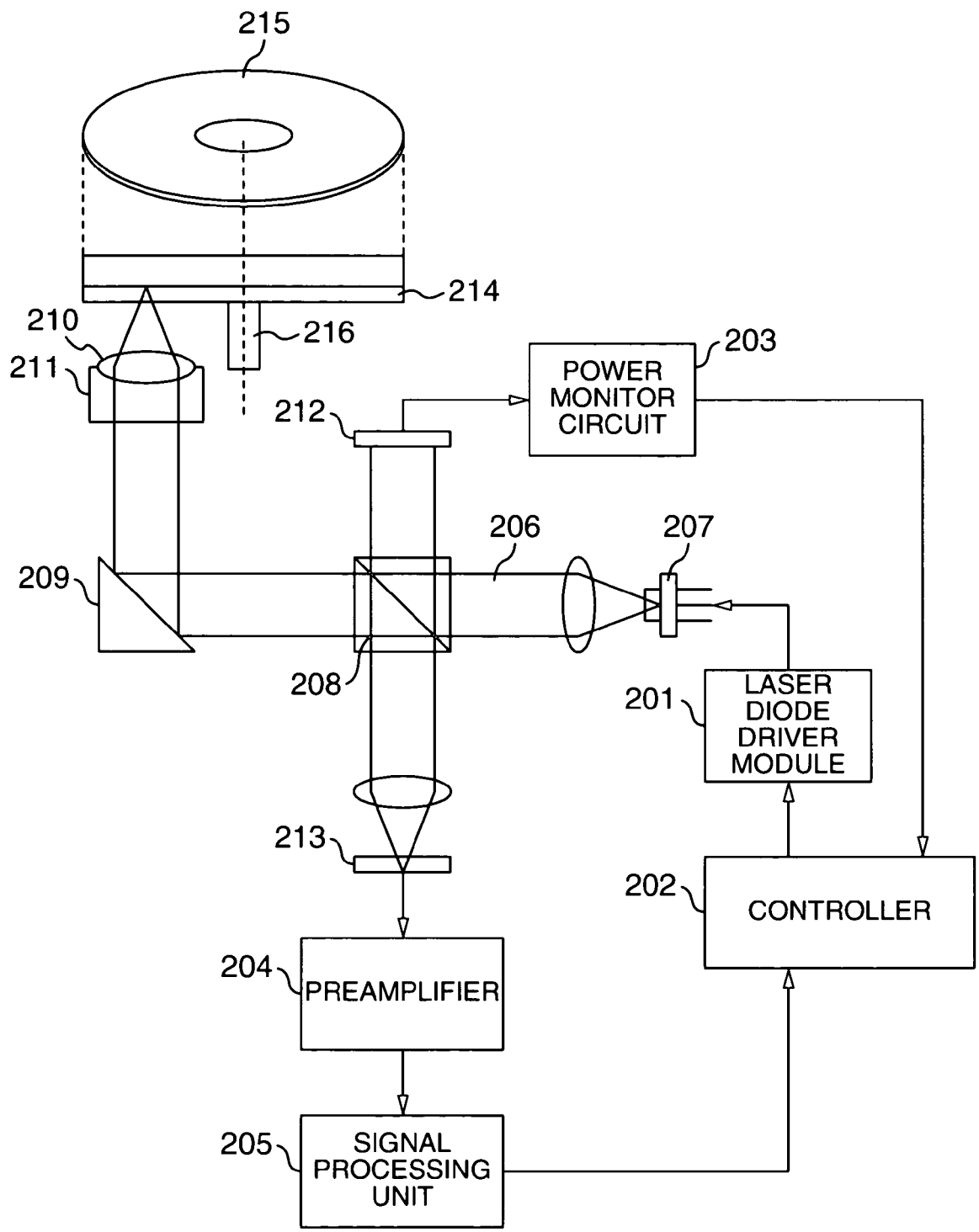
FIG. 2 is a block diagram showing schematically a major portion of an optical disk apparatus.

A first embodiment of the present invention will be described by referring to FIG. 1 together with FIGS. 5A to 5C. In this conjunction, it is assumed that the structure of the optical disk apparatus or drive employed in the instant embodiment of the invention is identical with that described hereinbefore by reference to FIG. 2. Accordingly, repetitional description concerning the optical disk apparatus will be unnecessary.

Figure 5A:
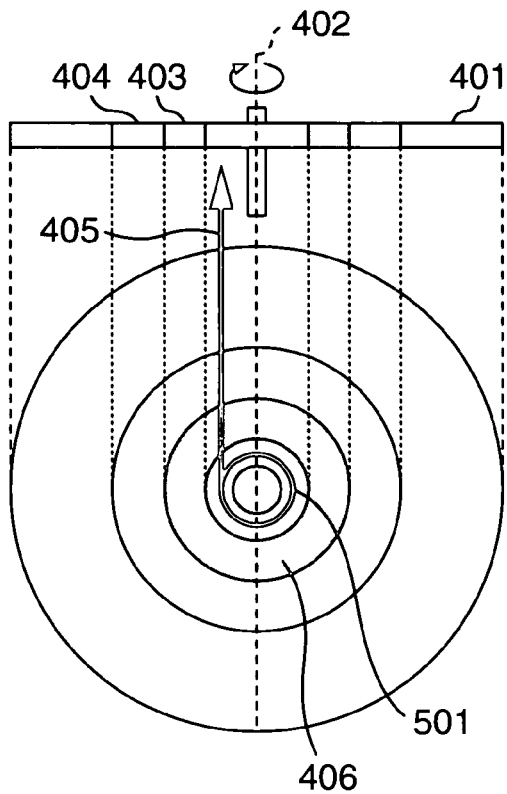
FIGS. 5A, 5B and 5C are views for illustrating the OPC according to the first embodiment of the present invention.
Figure 5B:
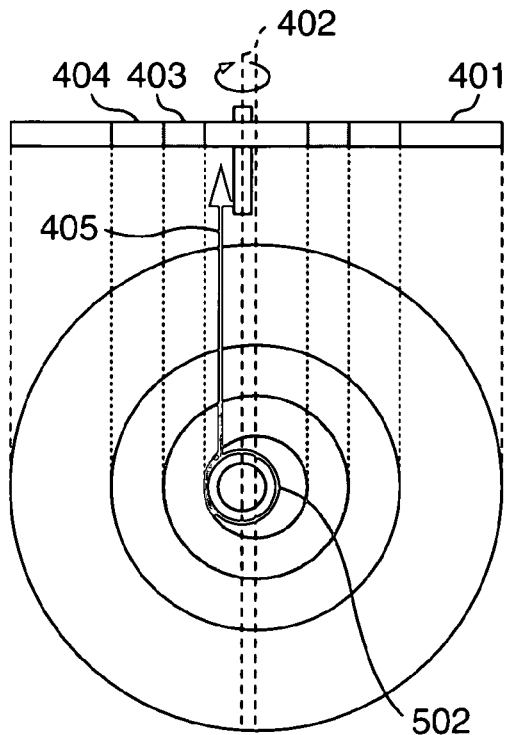
Figure 5C:
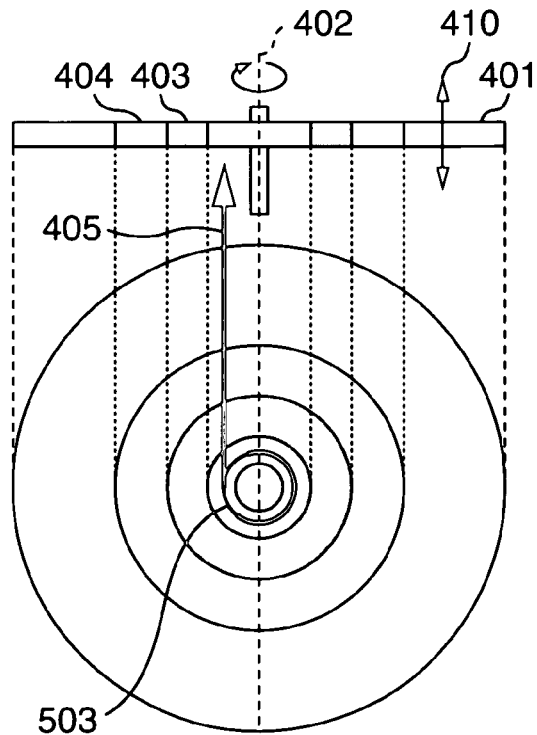

FIGS. 5A, 5B and 5C are views showing the statuses in which the projection of laser beam is performed in the defocused state with the position of the objective lens being shift toward the radially inner side beyond the PCA. In these figures, reference numerals 501, 502 and 503 denote, respectively, locuses along which the recordable surface is irradiated with the laser beam 405 in the defocused state.

Figure 4A:
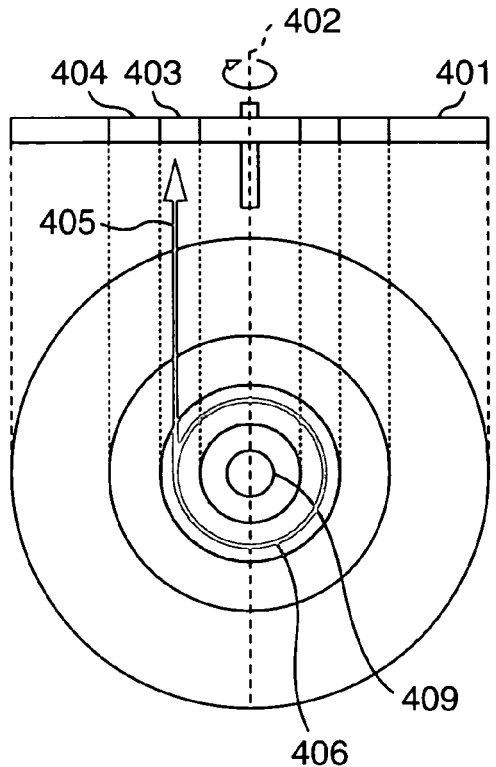
FIGS. 4A, 4B and 4C are views for illustrating problems of a conventional OPC.

More specifically, FIG. 5A is a view illustrating the ideal state in the laser power adjusting method according to the present invention. This state is same as that shown in FIG. 4A except that the locus along which the recordable surface is irradiated with the laser beam is on the radially inner side of the PCA 403. In the case of the laser irradiation illustrated in FIG. 5A, the locus 501 does not extend through the PCA 403 and the RMA 404. Accordingly, there is no possibility that the data recorded in these areas are destroyed.

Figure 4B:
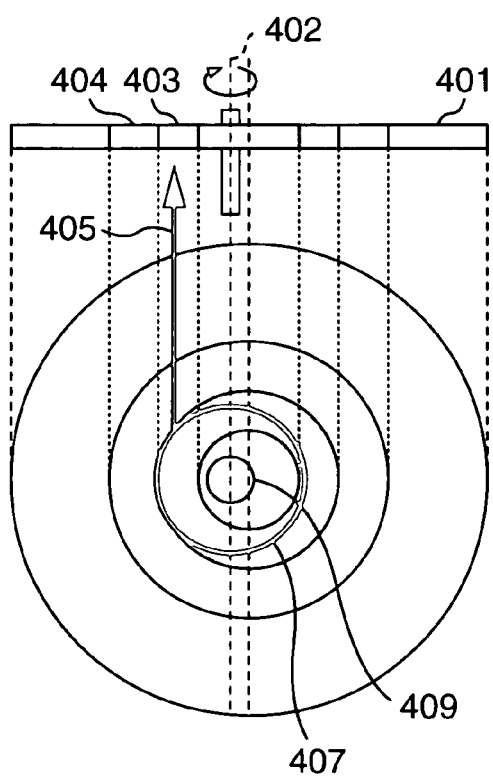

Next, referring to FIG. 5B, description will turn to the case where an eccentric disk. The state shown in FIG. 5B is same as that shown in FIG. 4B except that the location irradiated with the laser beam is on the radially inner side of the PCA 403. In the state where the eccentric disk is rotating, the locus 502 does not pass through either the PCA 403 or the RMA 404. In other words, these areas 403 and 404 are not irradiated with the laser beam. Consequently, there exists no possibility that the data recorded in these areas 403 and 404 are destroyed. Even in the case where the magnitude of eccentricity of the disk is greater than the displacement of the objective lens, it is only the PCA that the locus 502 passes through and undergoes the influence. On the other hand, the PMA area suffers no influence of the laser irradiation. Thus, the management data recorded in the PMA can be protected against destruction.

Figure 4C:
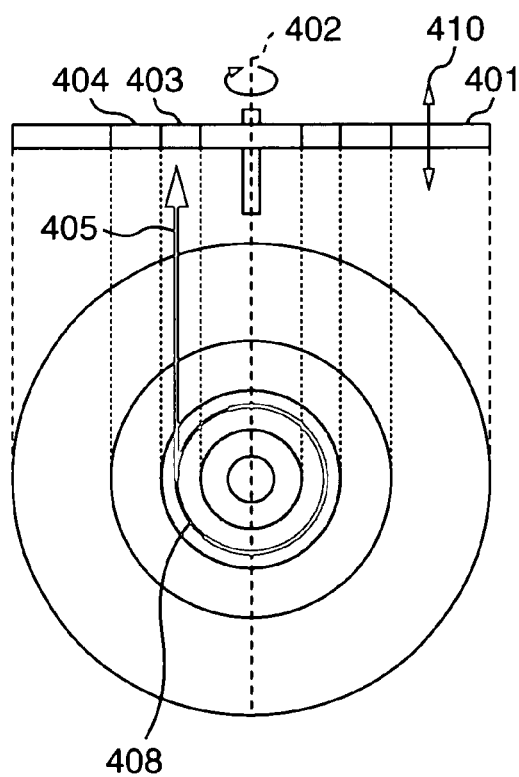

Next, referring to FIG. 5C, description will be made of the case where wobbling of the disk takes place in the course of the recording operation under the influence of a warp or warps of the disk, high-seed rotation thereof etc. The state now concerned is same as that illustrated in FIG. 4C except that the location irradiated with the laser beam is on the radially inner side relative to the PCA 403. Consequently, even when the disk is rotating with wobbling in the upward and downward directions as indicated by an arrow 410 upon recording operation with the result that the recordable surface assumes partially the just-focused state, the locus 503 passes through neither the PCA 403 nor the RMA 404. Thus, there is no possibility that the data stored in these areas are destroyed.

Description will be made in more detail by reference to FIG. 1 in which a portion 101 of the optical disk inner peripheral area is shown, being enlarged as designated by a numeral 102. Further, in FIG. 1, reference numeral 103 denotes a light beam spot formed on the disk recordable surface in the PCA by the laser beam, and numeral 104 denotes a light beam spot formed on the recordable surface by the laser beam in the area located on the radially inner side relative to the PCA. As shown in FIG. 3, the leading sector address of the PCA 403 is "1E800h" while that of the RMA is "203C0h". Incidentally, the width of the PCA 403 is about 0.2 mm in the radial direction.

After seeking the near-by position 103 at the radially innermost periphery of the PCA (the near-by position 103 may be set with tolerance on the order of ±0.1 mm relative to the radially innermost position of the PCA), defocused state is set, which is then followed by displacement of the position of the objective lens toward the inner periphery by about 0.3 mm, whereon defocused laser irradiation is effected at the position 104. In that case, so long as the eccentricity of the disk is smaller than 0.3 mm inclusive, neither the PCA 403 nor the RMA 404 is subjected to laser irradiation, whereby the data stored in these areas can be protected from destruction.

Figure 6:
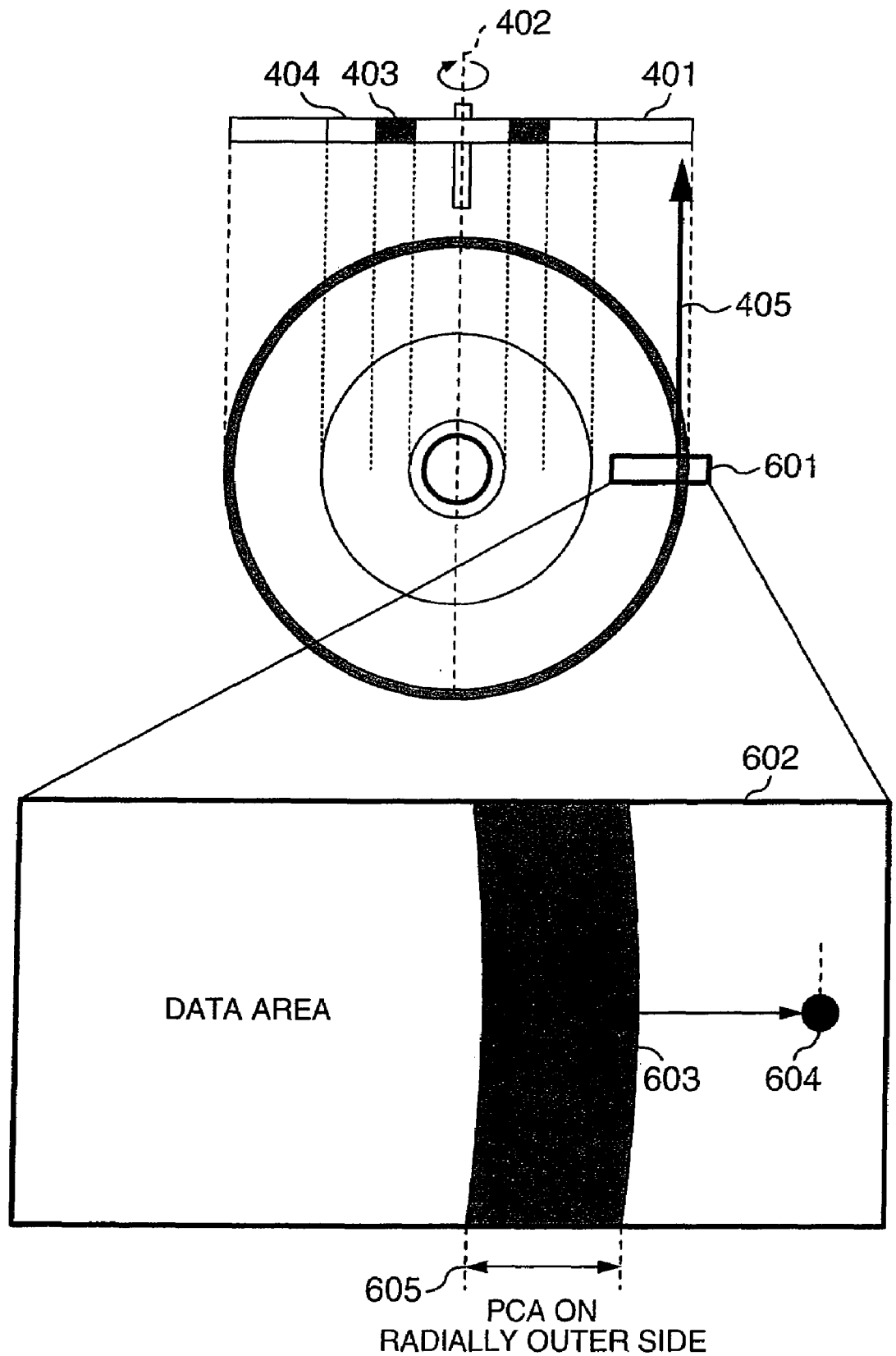
FIG. 6 is a view for illustrating the OPC according to a second embodiment of the present invention.

Next, the description will be directed to a second embodiment of the present invention by reference to FIG. 6. In the case of the instant embodiment of the invention, it is assumed that the optical disk having an outer peripheral PCA 605 is employed. In this case, the position of the objective lens is shifted toward the outer periphery beyond the outer peripheral PCA 605, whereon the OPC is performed. Owing to this procedure, substantially same advantageous effect as described previously in conjunction with the first embodiment can be obtained.

Referring to FIG. 6, a portion 601 of the outer peripheral area of the optical disk is shown, being enlarged as designated by reference numeral 602. Further, in the figure, numeral 603 denotes a light beam spot formed on the recordable surface in the PCA by the laser beam, and numeral 604 denotes an light beam spot formed by the laser beam on the recordable surface in an outer peripheral area located on the radially outer side relative to the PCA. After seeking at first the position 603 at the radially outermost periphery of the outer peripheral PCA 605, defocused state is set, which is then followed by displacement of the objective lens toward the radially outer side of the disk by about 0.3 mm in the radial direction to thereby set the objective lens at the position 604. Subsequently, the defocused laser irradiation is effected at the position 604. In this case, so long as the eccentricity of the disk is smaller than 0.3 mm inclusive, neither the PCA 605 nor the data area undergoes the laser irradiation, whereby the data recorded in these areas can be protected against destruction.

In the foregoing description of the embodiments of the present invention, it has been assumed that magnitude of the displacement of the objective lens is about 0.3 mm. However, it goes without saying that the above-mentioned value may be changed to an appropriate one in dependence on the disk format structure, the system configuration and the device faculty.

Furthermore, although the foregoing description has been made in conjunction with the disk format structure of the DVD-R, it should be understood that this is only by way of example. The teaching of the present invention can equally be applied to the optical disk designed for data recording by changing the physical properties of the data recordable surface by converting optical energy to heat energy such as exemplified by the CD-R disk, Blu-ray disc or the like.

Besides, the teaching of the invention can also be effectively applied to a so-called multi-layer disk in which a plurality of data recording layers are stacked on the disk so that data can be recorded on each of these layers, although such multi-layer disk is presently at the stage of development.

Finally, description will be made of the advantageous effect obtained by adopting the teaching of the invention incarnated in the first embodiment.

In accompanying with increasing of recording speed of the optical disk, there has been developed a recording/reproducing apparatus adopting the ZCLV (Zoned Constant Calibration Linear Velocity) scheme according to which the disk is divided into several zones from the radially inner periphery and in each of the zones the linear velocity is maintained constant. Ordinarily, the PCA exists in the inner peripheral area and the OPC is carried out at the recording speed for the radially inner peripheral zone. For the recording operation in the radially outer peripheral area, it is desirable to effect the OPC at the recording speed for the outer peripheral zone. However, since the rotation speed of the radially inner periphery is limited, it is impossible to carry out the OPC at the rotation speed for the radially outer periphery, i.e., at the recording speed for the radially outer peripheral zone.

Under the circumstances, the irradiation power for the radially outer peripheral zone may be determined through the procedure described below.

At first, the OPC is carried out at the recording speed rated for the inner peripheral zone to thereby determine the irradiation power for the inner peripheral zone. Subsequently, the intensity value of the light rays emitted at the irradiation power as determined is detected by means of a front monitor.

The driving current of the laser diode 207 and the laser emission power bear a proportional relation to each other. Accordingly, representing the detection value of the laser emission power by e.g. "A" it is possible to realize the desired laser emission power for the outer peripheral zone by adjusting the driving current of the laser diode 207 on the basis of the value detected by the front monitor such that the outer peripheral zone is irradiated with the laser power twice as large as "A" when it is known that the irradiation power demanded for the outer peripheral zone is twice as large as "A". (Of course, the invention is never restricted to "twice" but an integral multiple of "A" is passable.) In this conjunction, high-power irradiation is required for adjusting the driving current. However, by performing the defocused irradiation at the radially inner area relative to the PCA according to the teaching of the present invention, the defocused high-power laser irradiation can be realized with safety without involving data destruction due to erroneous data recording or overwrite recording even in the recording on the eccentric disk or regardless of occurrence of wobbling upon recording.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical disk apparatus for recording data on a recordable optical disk having a power calibration area and a recording management area both located on an inner periphery thereof, and an area located radially inwardly of the power calibration area and the recording management area, the optical disk apparatus comprising:
    a laser diode for emitting a laser beam;
    a laser diode driver module for driving the laser diode;
    an objective lens for constricting the laser beam;
    objective lens driving means for driving the objective lens in a radial direction of the recordable optical disk;
    a front monitor for detecting a portion of the laser beam emitted from the laser diode to monitor a laser power of the laser beam; and
    control means for controlling the laser diode driver module and the objective lens driving means,
    wherein said control means controls the objective lens driving means such that the laser beam is irradiated on the area in a defocused state, but is not irradiated on the power calibration area or the recording management area, while controlling the laser diode driver module for emitting the laser beam to observe an optical amount of the irradiation using the front monitor for the purpose of adjusting the laser power,
    wherein light returned from the area of the recordable optical disk is not substantially detected.

2. The optical disk apparatus according to claim 1, wherein the objective lens driving means is operable to cause the objective lens to seek a location close to an innermost periphery of the power calibration area and subsequently move the objective lens more radially inwardly than the power calibration area and the recording management area.

3. The optical disk apparatus according to claim 1, wherein the objective lens driving means includes a slider for roughly moving the objective lens and a tracking coil for finely moving the objective lens, and wherein upon moving the objective lens inwardly beyond the power calibration area and the recording management area, the objective lens is roughly moved by using the slider.

4. The optical disk apparatus according to claim 1, wherein the objective lens driving means includes a slider for roughly moving the objective lens and a tracking coil for finely moving the objective lens, and wherein upon moving the objective lens inwardly beyond the power calibration area and the recording management area, the objective lens is roughly moved by using said slider and thereafter said objective lens is finely moved by means of the tracking coil.

5. The optical disk apparatus according to claim 1,
    wherein the area of the recordable optical disk located inwardly of the power calibration area and the recording management area is an area in which data cannot be recorded.

6. An optical disk apparatus for recording data on a recordable optical disk having a power calibration area located on an outer periphery thereof, and an area located radially outwardly of the power calibration area, the optical disk apparatus comprising:
    a laser diode for emitting a laser beam;
    a laser diode driver module for driving the laser diode;
    an objective lens for constricting the laser beam;
    objective lens driving means for driving the objective lens in a radial direction of the recordable optical disk;
    a front monitor for detecting a portion of the laser beam emitted from the laser diode to monitor a laser power of the laser beam; and
    a control circuit for controlling the laser diode driver module and the objective lens driving means,
    wherein the control circuit controls the objective lens driving means such that the laser beam is irradiated on the area in a defocused state, but is not irradiated on the power calibration area, while controlling the laser diode driver module for emitting the laser beam to observe an optical amount of the irradiation using the front monitor for the purpose of adjusting the laser power,
    wherein light returned from the area of the recordable optical disk is not substantially detected.

7. The optical disk apparatus according to claim 6,
    wherein said objective lens driving means includes a slider for roughly moving said objective lens and a tracking coil for finely moving said objective lens, and
    wherein upon moving said objective lens outwardly beyond the power calibration area, said objective lens is roughly moved by using said slider.

8. The optical disk apparatus according to claim 6,
    wherein said objective lens driving means includes a slider for roughly moving said objective lens and a tracking coil for finely moving said objective lens, and
    wherein upon moving said objective lens outwardly beyond the power calibration area, said objective lens is roughly moved by using said slider and thereafter said objective lens is finely moved by means of said tracking coil.

9. The optical disk apparatus according to claim 6,
    wherein the area of the recordable optical disk located outwardly of the power calibration area is an area in which data cannot be recorded.

* * * * *